US011189384B2

(12) United States Patent
Peterson

(10) Patent No.: US 11,189,384 B2
(45) Date of Patent: Nov. 30, 2021

(54) SYSTEMS AND METHODS FOR ENHANCING ISOLATION OF HIGH-TEMPERATURE REACTOR CONTAINMENTS

(71) Applicant: THE REGENTS OF THE UNIVERSITY OF CALIFORNIA, Oakland, CA (US)

(72) Inventor: Per F. Peterson, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 681 days.

(21) Appl. No.: 15/684,062

(22) Filed: Aug. 23, 2017

(65) Prior Publication Data

US 2018/0012669 A1    Jan. 11, 2018

Related U.S. Application Data

(62) Division of application No. 14/533,055, filed on Nov. 4, 2014, now Pat. No. 9,773,574.

(Continued)

(51) Int. Cl.
*G21C 13/10* (2006.01)
*G21C 11/08* (2006.01)
(Continued)

(52) U.S. Cl.
CPC .............. *G21C 11/08* (2013.01); *G21C 13/02* (2013.01); *G21C 13/10* (2013.01); *G21C 15/12* (2013.01); *G21C 15/18* (2013.01); *Y02E 30/30* (2013.01)

(58) Field of Classification Search
CPC .................................. Y02E 30/35; G21C 3/54
See application file for complete search history.

(56) References Cited

U.S. PATENT DOCUMENTS 2,967,809 A * 1/1961 Reed ................... G21C 3/36
376/308
3,401,082 A * 9/1968 Ammon ............... G21C 9/00
376/307
(Continued)

FOREIGN PATENT DOCUMENTS

JP    2009174807 A  *  8/2009
KR    20110018624 A  *  2/2011

OTHER PUBLICATIONS

Cisneros, Anselmo T., et al. "Technical Description of the "Mark 1" Pebble-Bed Fluoride-Salt-Cooled High-Temperature Reactor (PB-FHR) Power Plant." Tech. Rep.. Department of Nuclear Engineering, University of California Berkeley, 2014.*

*Primary Examiner* — Lily C Garner
(74) *Attorney, Agent, or Firm* — O'Banion & Ritchey LLP; John P. O'Banion

(57) ABSTRACT

A high-temperature containment-isolation system for transferring heat from a nuclear reactor containment to a high-pressure heat exchanger is presented. The system uses a high-temperature, low-volatility liquid coolant such as a molten salt or a liquid metal, where the coolant flow path provides liquid free surfaces a short distance from the containment penetrations for the reactor hot-leg and the cold-leg, where these liquid free surfaces have a cover gas maintained at a nearly constant pressure and thus prevent high-pressures from being transmitted into the reactor containment, and where the reactor vessel is suspended within a reactor cavity with a plurality of refractory insulator blocks disposed between an actively cooled inner cavity liner and the reactor vessel.

5 Claims, 12 Drawing Sheets

Related U.S. Application Data

(60) Provisional application No. 61/899,867, filed on Nov. 4, 2013.

(51) Int. Cl.
*G21C 13/02* (2006.01)
*G21C 15/12* (2006.01)
*G21C 15/18* (2006.01)

(56) References Cited

U.S. PATENT DOCUMENTS

| | | | | |
|---|---|---|---|---|
| 3,793,143 | A | * | 2/1974 | Muller ............... G21C 1/02 376/403 |
| 3,912,584 | A | * | 10/1975 | Rubinstein ........ G21C 15/247 376/179 |
| 3,951,738 | A | * | 4/1976 | George ............. G21C 15/24 376/307 |
| 4,038,134 | A | | 7/1977 | Dorner |
| 4,062,726 | A | | 12/1977 | Walling |
| 4,069,101 | A | * | 1/1978 | Mangus ............ F04D 29/426 376/403 |
| 4,233,116 | A | * | 11/1980 | Mangus ............ G21D 1/04 376/277 |
| 4,425,963 | A | | 1/1984 | Scholz |
| 4,534,712 | A | * | 8/1985 | Kanbe ............. F04D 15/0218 376/203 |
| 4,606,882 | A | | 8/1986 | Aspden |
| 4,983,353 | A | * | 1/1991 | Boardman ........ F22B 1/063 122/32 |
| 2010/0296620 | A1 | * | 11/2010 | Peterson .......... G21C 3/30 376/330 |

\* cited by examiner

I # SYSTEMS AND METHODS FOR ENHANCING ISOLATION OF HIGH-TEMPERATURE REACTOR CONTAINMENTS

CROSS-REFERENCE TO RELATED APPLICATIONS

This application is a division of U.S. patent application Ser. No. 14/533,055 filed on Nov. 4, 2014, incorporated herein by reference in its entirety, which claims priority to, and the benefit of, U.S. provisional patent application Ser. No. 61/899,867 filed on Nov. 4, 2013, incorporated herein by reference in its entirety.

STATEMENT REGARDING FEDERALLY SPONSORED RESEARCH OR DEVELOPMENT

This invention was made with Government support under DE-AC07-051D14517 awarded by the United States Department of Energy (DOE). The Government has certain rights in the invention.

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This technology pertains generally to high temperature reactor containments, and more particularly to isolation of containments for high temperature reactors using low volatility, liquid reactor coolants.

2. Background Discussion

Fluoride-salt-cooled, high-temperature reactors (FHRs), molten salt reactors (MSRs), sodium fast reactors (SFRs), lead fast reactors (LFRs) and other liquid cooled high temperature reactors use high-temperature, low-volatility liquid coolant to transfer heat from the reactor containment structure to a process heat or power conversion heat exchanger. Because the process heat fluid or power conversion fluid (such as water, air, carbon dioxide, or helium) is normally at a higher pressure than the low-volatility liquid coolant, and may react chemically with the coolant, leaks in these process heat and power conversion heat exchangers have the potential to cause excessive pressurization, water-hammer transmission, or shock transmission into the reactor vessel and the reactor containment structure. Because the reactor vessel and containment structure provides key barriers to the release of radioactive material from the reactor during any accident, overpressure and damage to the reactor vessel and piping, as well as the containment structure, must be avoided.

The issue of mitigating overpressure has been particularly important for SFRs that use steam-Rankine power cycles, where the power conversion heat exchanger is a steam generator and very high overpressures can potentially occur if a tube leaks in the steam generator. Prior measures to prevent overpressure in SFR containment due to steam generator tube leaks include the use of double-walled steam generator tubes, the integration of a rupture disk into the steam generator, and the integration of one or more compressible gas cavities inside a steam generator.

While it is highly unlikely for a reactor vessel to leak or rupture, reactors like FHRs, SFRs and LFRs that use low-pressure liquid coolants are designed to prevent fuel from becoming uncovered and to allow continued removal of decay heat even if this occurs. Prior measures to prevent fuel from being uncovered if the reactor vessel leaks have used a "guard vessel" located outside the reactor vessel to collect the leaked coolant and limit the amount that can leak.

BRIEF SUMMARY

An aspect of the present disclosure is a high-temperature containment-isolation system for transferring heat from a nuclear reactor containment to a high-pressure heat exchanger using a high-temperature, low-volatility liquid coolant such as a molten salt or a liquid metal, where the coolant flow path provides liquid free surfaces a short distance from the containment penetrations for the reactor hot-leg and the cold-leg, where these liquid free surfaces have a cover gas maintained at a nearly constant pressure and thus prevent high-pressures from being transmitted into the reactor containment.

Another aspect is a containment isolation system where the hot coolant exiting the reactor containment flows through an isolation valve into a hot-well vessel, which has a significant total free liquid surface and contains a centrifugal pump that circulates the hot fluid through a crossover-leg to a high-pressure heat exchanger.

In one embodiment of the current aspect, the hot well has sufficient volume to accommodate level changes due to thermal expansion of the coolant in the loop and due to changes in level at other free surfaces in the loop when pump speeds are changed.

In another embodiment of the current aspect, the hot well has a gate valve to seal and isolate the hot-leg pipe entering the hot well, to provide isolation of the reactor vessel and containment.

In another embodiment of the current aspect, the hot well is configured such that the bottom of the suction of the pump is above the top of the hot leg pipe and isolation valve, so draining the cross-over leg to the high-pressure heat exchanger does not break the seal or drain the hot leg pipe.

Another aspect is a containment isolation system where the cold coolant reentering the reactor containment flows upward in a standpipe and then across through a cold leg pipe into the reactor containment, and where the standpipe has a liquid free surface, and this liquid free surface has a cover gas maintained at a nearly constant pressure and thus prevents high-pressures from being transmitted into the reactor containment.

In one embodiment of the current aspect, the standpipe has a nearly neutrally buoyant plug that fills a significant fraction of the volume above the horizontal penetration into containment, that reduces the volume of coolant in the standpipe above the penetration and thus the level change in the hot well when pump speed is changed, while still limiting the maximum pressure that can be established at the cold leg penetration.

In another embodiment of the current aspect, the standpipe has a gate valve to seal the cold leg pipe entering the reactor containment, to provide isolation of the reactor containment.

In another embodiment of the current aspect, the standpipe includes a seal loop, which prevents the cold leg from draining when the standpipe is drained.

In another embodiment of the current aspect, the standpipe has a drain tank located below it, with a drain line and a freeze or other type of isolation valve to allow the coolant loop to be drained and cooled for inspection and maintenance, and then refilled.

In another embodiment of the current aspect, the standpipe has an overflow line above the normal coolant level to return coolant to the hot well or a drain tank if over-pressure occurs.

Another aspect is a containment isolation system with a plurality of coolant loops, hot wells, main coolant pumps, and high pressure heat exchangers.

In one embodiment of the current aspect, for a plurality of loops each hot well is connected to adjacent hot wells by conduits above the elevation of the cross-over legs, to allow cross flow between the hot wells to maintain a constant hot-well coolant level.

In another embodiment of the current aspect, each coolant loop in the plurality of loops can be drained and cooled independently for inspection and maintenance while other coolant loops remain filled.

Another aspect is a high temperature reactor (HTR) cooled by a low-volatility, liquid coolant, comprising a reactor cavity having an inner cavity wall, and a reactor vessel disposed within the reactor cavity, wherein the reactor vessel is suspended within the reactor cavity with a plurality of refractory insulator blocks disposed between the inner cavity wall and the reactor vessel.

In one embodiment of the current aspect, the reactor vessel is suspended in the reactor cavity via a conical support ring having a first end coupled to the inner cavity wall and a second end coupled to the reactor vessel.

Further aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

1. Isolation of High-Temperature Reactor Containments

One aspect of the present disclosure is a system to prevent a leak from a high-pressure process heat or power conversion heat exchanger from causing excessive pressurization or shock loading inside the reactor containment.

In a conventional configuration to transfer heat from a nuclear reactor containment to a process heat or power conversion heat exchanger outside of the containment using a low-volatility liquid, the hot liquid exits the reactor containment structure through one or more hot-leg penetrations. The coolant flows to the high-pressure heat exchanger, and then returns via one or more cold-leg penetrations back inside the reactor containment to be heated again. The pump that circulates the coolant may be in a variety of locations around the loop, either inside or outside containment.

Figure 1A:
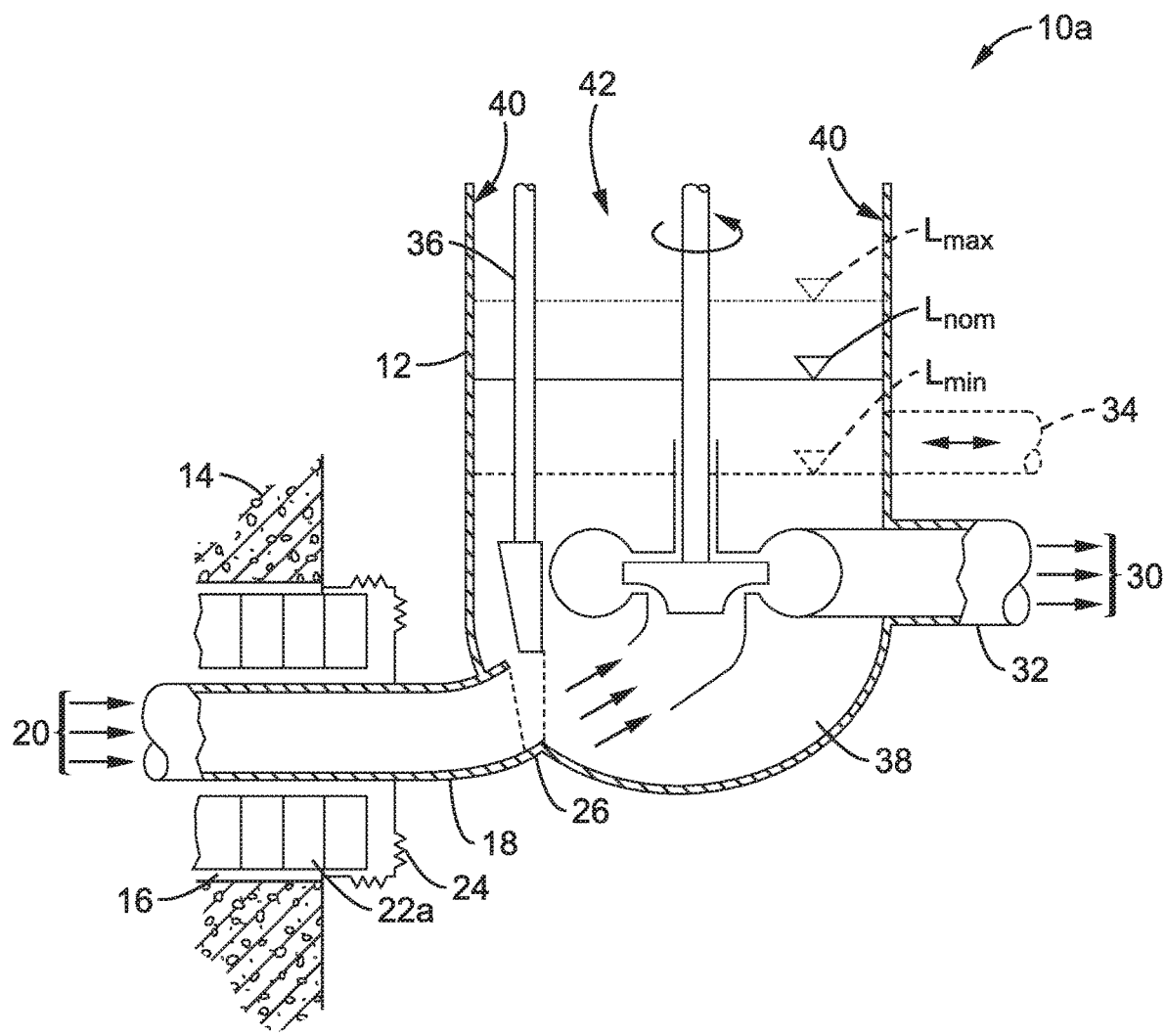
FIG. 1A is a schematic diagram of a hot leg/hot well vessel connection according to an embodiment of the present disclosure.
Figure 1B:
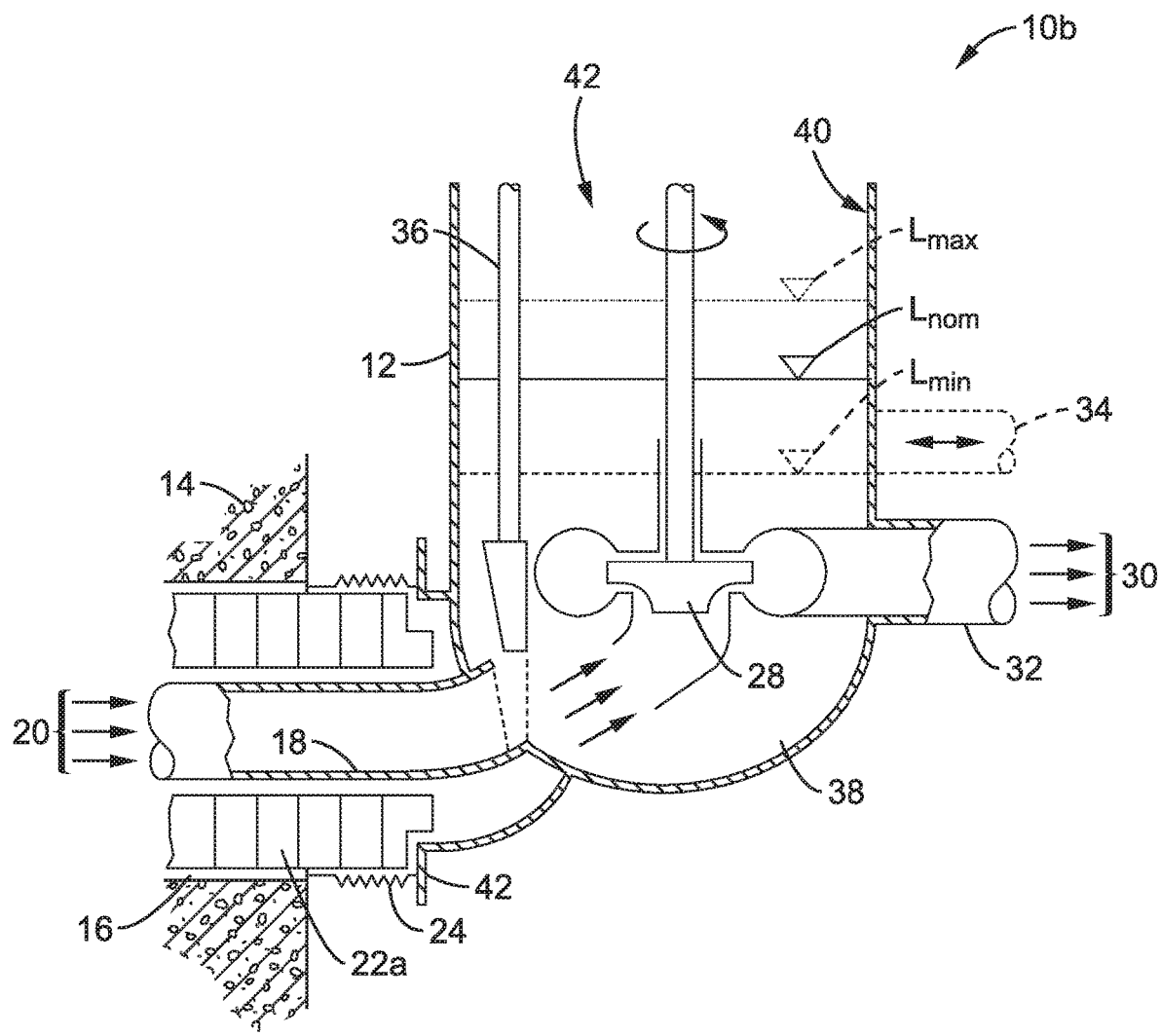
FIG. 1B is a schematic diagram of the hot leg/hot vessel connection of FIG. 1A with an alternative, extended bellows configuration.

In the systems 10A and 10B shown in FIG. 1A and FIG. 1B, the hot coolant 20 exits the containment through a hot-leg pipe 18 that passes through an insulated penetration in the reactor cavity wall 14 with a bellows seal 24 around the pipe. Immediately outside the containment penetration the hot coolant 20 flows through an isolation valve 36, and then into a hot-well vessel 12 located close to the hot-leg penetration to minimize the length of the hot leg 18. The hot well vessel 12 preferably has a substantial liquid free surface area 40 within its internal chamber 38 and sufficient volume to accommodate level changes due to thermal expansion of the coolant in the loop and due to changes in level at other free surfaces in the loop when pump speeds are changed.

FIG. 1A shows a containment configuration 10a with hot leg 18 connecting to hot well vessel 12. The steel and concrete reactor cavity wall 14 has a steel liner 16 that is actively cooled by water or air, and that extends through the cavity wall 14. This penetration has internal insulation 22a, around the hot leg pipe 18 and the containment boundary is formed by a bellow seal 24 between the hot leg 18 and the containment liner 16. After the bellow seal 24, all coolant piping and the hot well 12 preferably use an external insulation system with internal trace heating (not shown).

The primary monitoring of coolant inventory for protective functions uses level instrumentation located in the hot well. The hot well 12 is designed to have a sufficiently large salt surface area that level swell due to thermal expansion of the coolant 20 and due to level changes at other free surfaces in the primary system result in acceptable level changes in the hot well.

If a plurality of hot well cavities and pumps is used, conduits 34 to connect the cavities may be positioned below the $L_{nom}$ level to provide cross flow between the cavities and maintain their surface levels equally. FIG. 1A and FIG. 1B also show a maximum coolant level ($L_{max}$) for hot accident condition and minimum salt level ($L_{min}$) for maintenance condition. If a plurality of hot well cavities is used, then the conduits 34 connecting the cavities are located above the minimum coolant level ($L_{min}$) to allow individual loops to be drained for maintenance.

The gate valve 36 in the hot well 12 allows the hot leg 18 to be isolated (e.g. when gate valve 36 is extended to the bottom location 26 in the vessel), and thus seals and isolates the hot-leg pipe 18 to provide isolation of the reactor vessel (see 110 in FIG. 3), concrete reactor cavity wall 14 and containment liner 16.

The hot well vessel 12 comprises a centrifugal pump 28 configured for discharging outbound coolant 30 to crossover leg 32. The crossover leg 32 transfers coolant to the high pressure heat exchanger. The bottom of the suction of the centrifugal pump 28 is preferably above the top of the hot leg pipe 18 and isolation valve 36, so draining the cross-over leg 32 does not break the seal or drain the hot leg pipe 18.

The volume of the internal chamber 38 of the hot well vessel 12 may have a cover gas 42 over the surface of the coolant and liquid free surfaces 40 of the chamber 38. The hot well cover gas system maintains a constant gas pressure over the hot well liquid free surfaces 40 and coolant level L.

FIG. 1B shows an alternative embodiment where the bellows 24 connects to a flange 42 integrated into the hot-well vessel 12. In this configuration, a break in the hot-leg pipe 18 would not result in a coolant leak outside of the reactor containment boundary.

In a preferred embodiment, the hot well 12 is supported by vertical bearings (not shown) that allow horizontal movement to accommodate thermal expansion of the hot leg 18. Snubbers (not shown) may be used to restrain the hot well 12 from rapid motion during seismic events.

Figure 7:
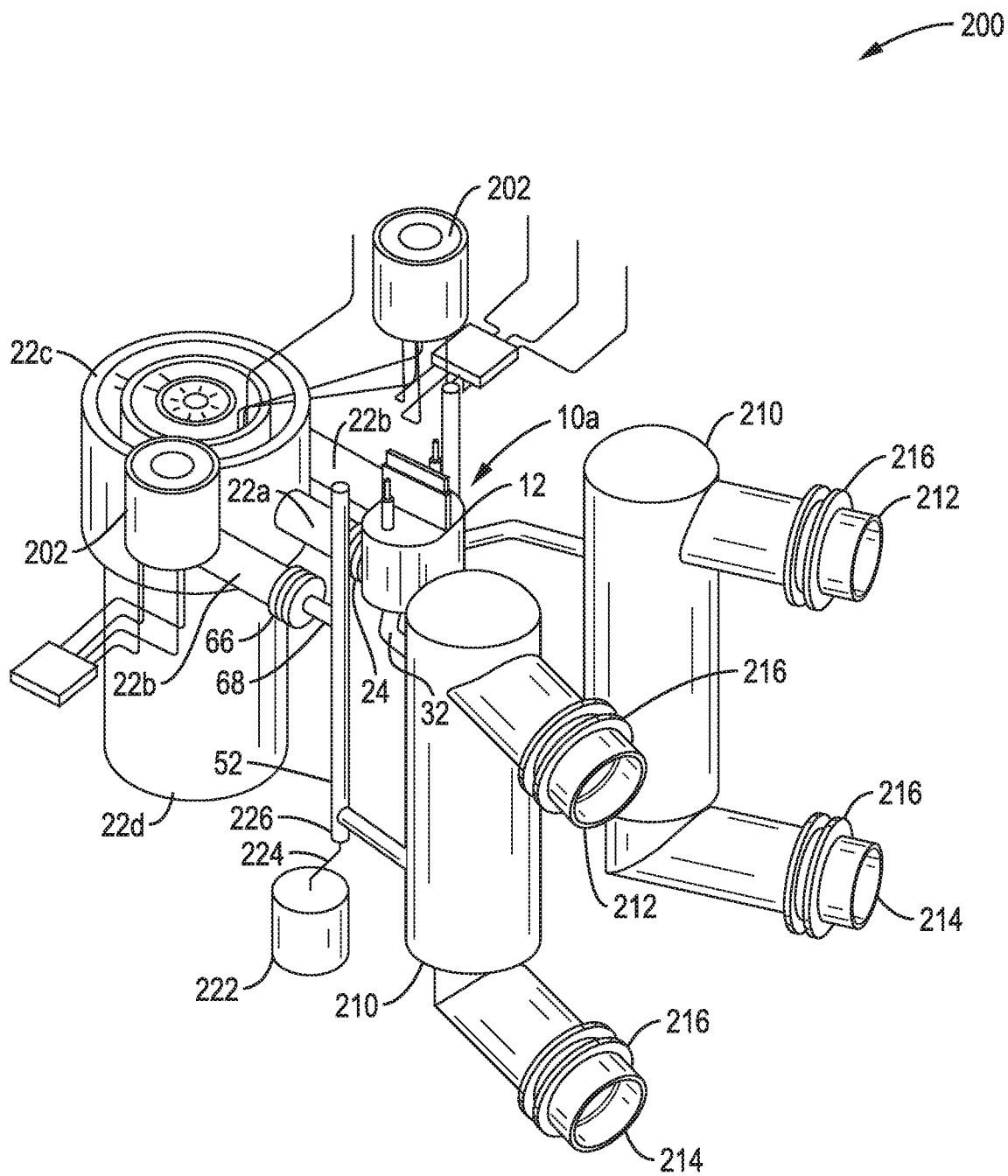
FIG. 7 shows a high-level schematic view of a heat transport and containment isolation system in accordance with the present description.

After exiting a high-pressure heat exchanger (see a representative embodiment, the coiled tube air heater 210 of FIG. 7), the coolant 30 flows back to a vertical cold-leg stand pipe that is adjacent to the reactor containment cold-leg penetrations of cavity liner 16.

FIG. 2A through FIG. 2D illustrate various embodiments of cold-leg stand-pipe systems 50a-50d in accordance with the present description. Cold coolant 70 reentering the reactor containment flows upward in a standpipe 52/58 and then across through a cold leg pipe 68 into the reactor containment liner 16. The standpipe 52/58 preferably has a liquid free surface 72, and this liquid free surface 72 has a cover gas 74 maintained at a nearly constant pressure and thus prevents high-pressures from being transmitted into the reactor containment.

Figure 2A:
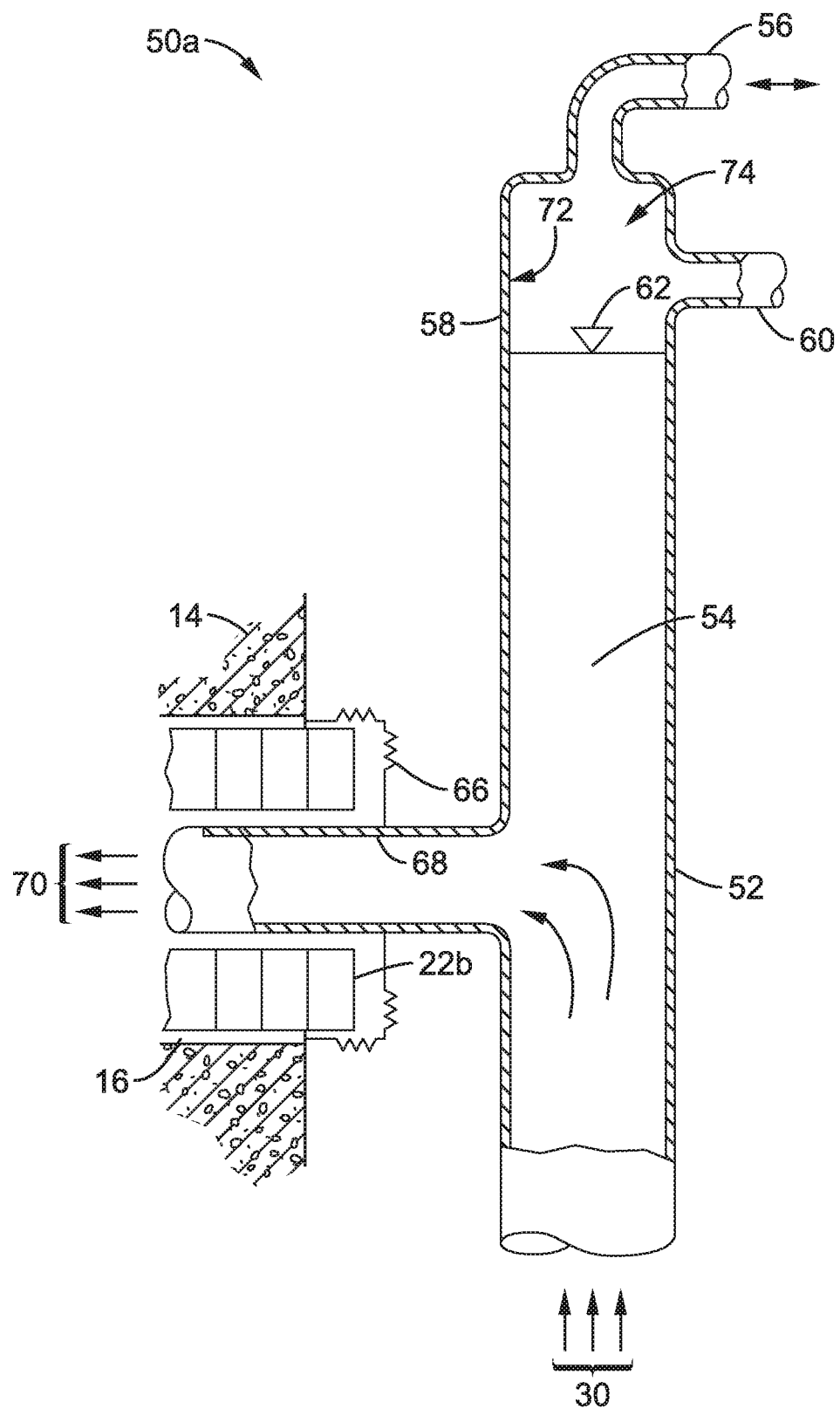
FIG. 2A is a schematic diagram of a cold-leg stand-pipe system having basic stand-pipe configuration.
Figure 2B:
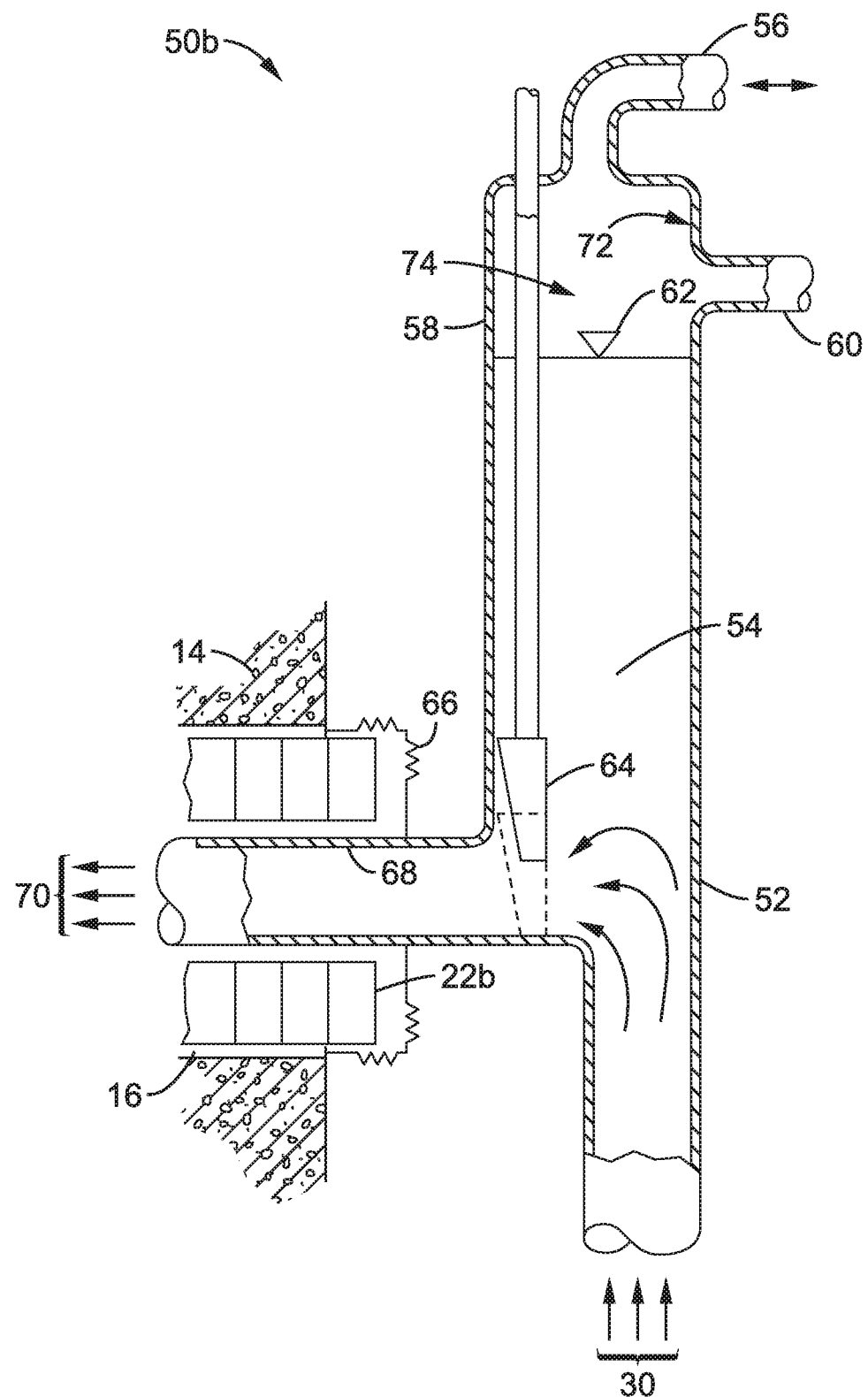
FIG. 2B is a schematic diagram of a cold-leg stand-pipe system having a stand-pipe with gate-type isolation valve.
Figure 2C:
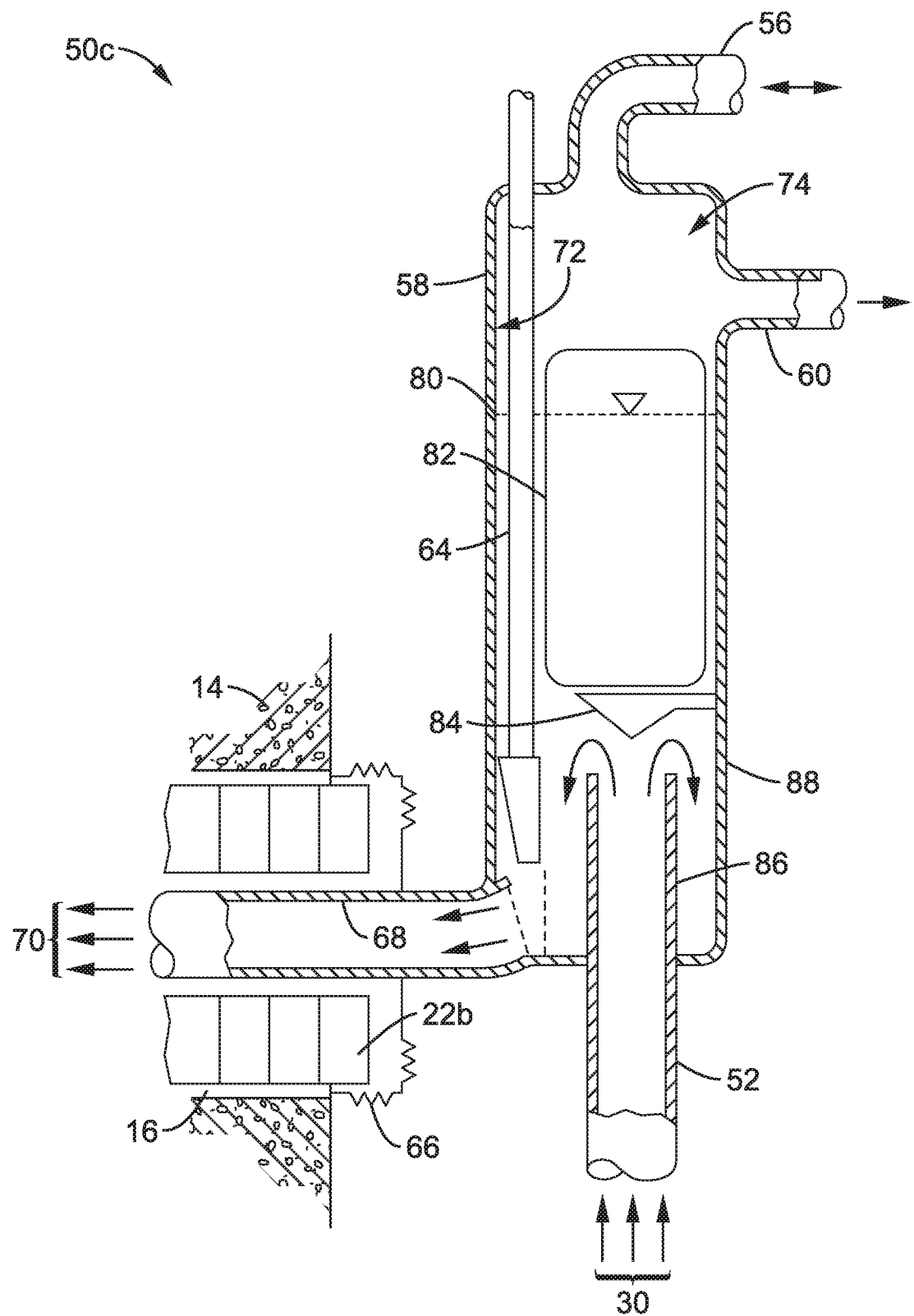
FIG. 2C is a schematic diagram of a cold-leg stand-pipe system having a stand pipe with anti-syphon seal loop and neutrally buoyant plug.
Figure 2D:
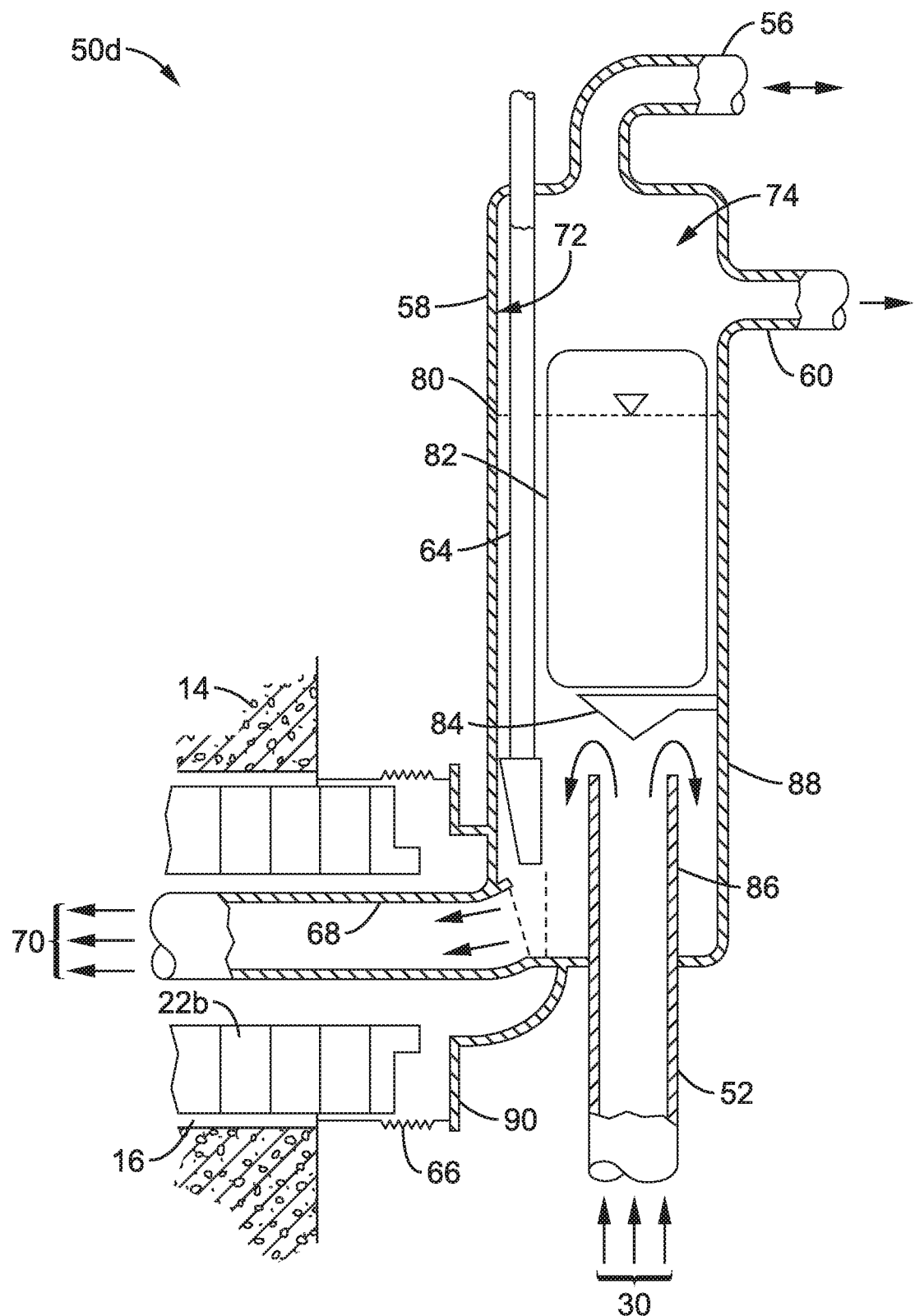
FIG. 2D is a schematic diagram of a cold-leg stand-pipe system of FIG. 2C having an alternative, extended bellows configuration.

FIG. 2A shows a basic stand-pipe configuration 50a, while FIG. 2B shows a stand-pipe configuration 50b with a gate-type isolation valve 64. FIG. 2C shows a stand pipe configuration 50c with anti-syphon seal loop and neutrally buoyant plug 82. FIG. 2D shows a stand pipe configuration 50d similar to the embodiment of FIG. 2C with a connection of the containment boundary bellows 66 to the stand-pipe vessel 88.

Referring to FIG. 2A and FIG. 2B, the standpipe 52 extends above the cold leg pipe 68 penetration sufficiently high such that under the highest fluid flow rate, the rise of liquid level 62 in the cold-leg standpipe due to the liquid flow 54 remains below the top 58 of the stand pipe 52.

Referring to FIG. 2A through FIG. 2D, the standpipe 52/88 has a gas supply system 56 that is capable of maintaining the gas pressure on the surface of the liquid at nearly atmospheric pressure. The existence of free liquid surfaces at both the hot and cold leg penetrations makes it difficult, if not impossible, to transmit high pressure into the reactor containment.

The top 58 of each stand pipe 52/88 extends above the upper horizontal cold leg 68 to accommodate the level swell that occurs under pump operation due to the pressure difference across the reactor vessel. An overflow pipe 60 is provided above the normal maximum free surface elevation 62, which will drain salt back to the hot well 12 or a drain tank (see 222 in FIG. 7) if the pressure drop across the reactor exceeds its normal design value or if the cold leg 68 is over pressurized.

The cold leg pipe 68 penetration into the reactor cavity wall 14 includes internal insulation 22b and bellows seal 66 connecting to the containment liner 16 for containing coolant in the event of a break in the cold leg pipe 68.

In embodiments 50b through 50d of FIG. 2B through FIG. 2D, an isolation gate valve 64 in the standpipe 52/88 is included to provide additional capability to isolate the flow of coolant 70 into the reactor 110 from cold leg pipe 68.

Referring to FIG. 2C and FIG. 2D, the stand pipe vessel 88 has integrated into its geometry an anti-siphon seal loop 86 and a nearly neutrally buoyant float 82. The seal loop created by the pipe extension 86 allows the stand pipe vessel 88 and stand pipe 52 to be drained for maintenance without draining the horizontal cold leg pipe 68.

The nearly-neutrally buoyant plug 82 is designed to displace most of the coolant volume (i.e. fill a significant portion of the volume) above the upper horizontal cold leg 68 to minimize the level drop that occurs in the hot well 12 when the pump operates and the coolant level increases in the cold-leg stand pipe. The plug 82 is configured to move freely in the vertical direction, to prevent overpressure of the reactor vessel from occurring during high-pressure heat exchanger tube (see FIG. 7) rupture events. Effectively, the plug 82 reduces the volume of coolant in the standpipe 88 above the penetration and thus the level change in the hot well 12 when pump speed is changed, while still limiting the maximum pressure that can be established at the cold leg 68 penetration.

The bottom of the plug 82 may also incorporate a burst diaphragm (not shown), compressible cavity (not shown), in addition to flow diverter 84 to mitigate transmission of hypothetical water hammer shocks into the upper horizontal cold leg.

FIG. 2D shows a configuration 50d similar to the configuration 50c of FIG. 2C, yet wherein the bellows 66 extends to a flange 90 integrated into the stand-pipe vessel 88, so that a break in the cold leg pipe 68 would be contained inside the containment boundary.

The bellows 66 (in addition to bellows 24 for the hot well system 10a/10b) are configured to be installed in a prestressed state, so that at normal operating temperatures the reactive forces imposed by the bellows, and the stresses in the bellows, are minimized. All salt pipe penetrations, both for the reactor containment 16 and for the high-pressure heat exchanger vessels (see 210 in FIG. 7), are oriented so that the displacements caused by thermal expansion are primarily axial along the length of the pipes. Therefore, the bellows seals must accommodate substantial axial displacements, as well as moderate transverse displacements.

It is appreciated that the embodiments shown in FIG. 1A to FIG. 2D may also be configured for use with reactors that have multiple coolant loops, hot wells, pumps and high pressure heat exchangers. When the reactor has two or more coolant loops, then the hot wells are connected by conduits 34 that allow cross flow between hot wells to maintain uniform coolant levels in all of the hot wells. The crossover legs 32 for each loop are then located at an elevation above the hot leg 18 and hot-leg isolation valve 36, and below the connecting pipes 34 between hot wells.

2. Reactor Cavity Configuration

Referring now to FIG. 3 through FIG. 6, features of a reactor cavity and reactor vessel system are shown that have desirable features for use with high temperature reactors (HTRs) cooled by low-volatility coolants, including fluoride salt cooled high temperature reactors (FHRs), lead fast reactors (LFRs), and sodium fast reactors (SFRs). These reactors generally use a pool-type vessel, which only has pipe penetrations at high elevations so that any break in a pipe cannot drain coolant below the level of fuel in the reactor.

The general design practice in FHRs, LFRs, and SFRs is to have a separate guard vessel to maintain the coolant inventory in the primary system if the reactor vessel leaks or ruptures. The system of the present disclosure uses a different design approach that eliminates the need for a guard vessel.

Figure 3:
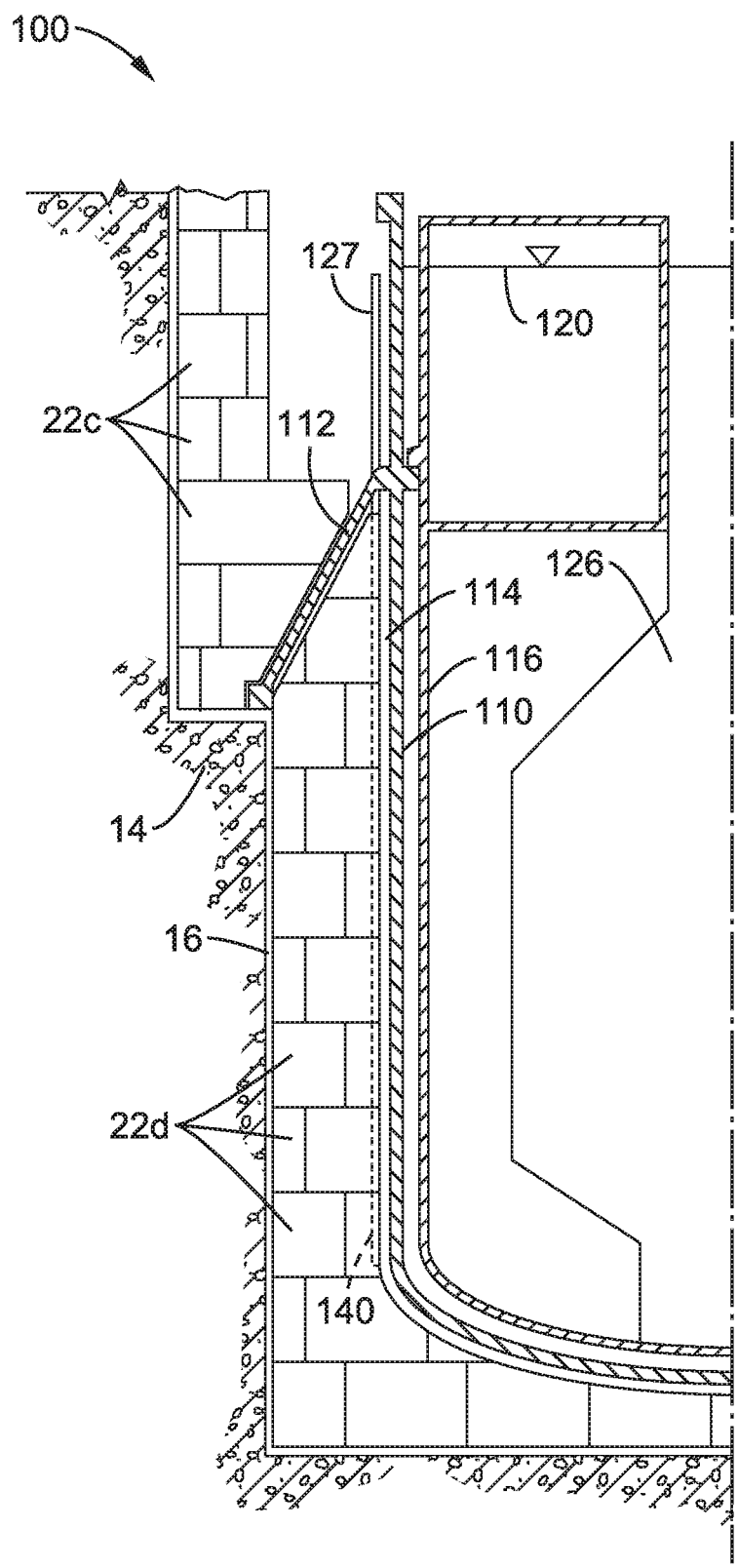
FIG. 3 is a schematic side view of a reactor cavity and core barrel design for a salt cooled high temperature reactor in accordance with the present disclosure.
Figure 4:
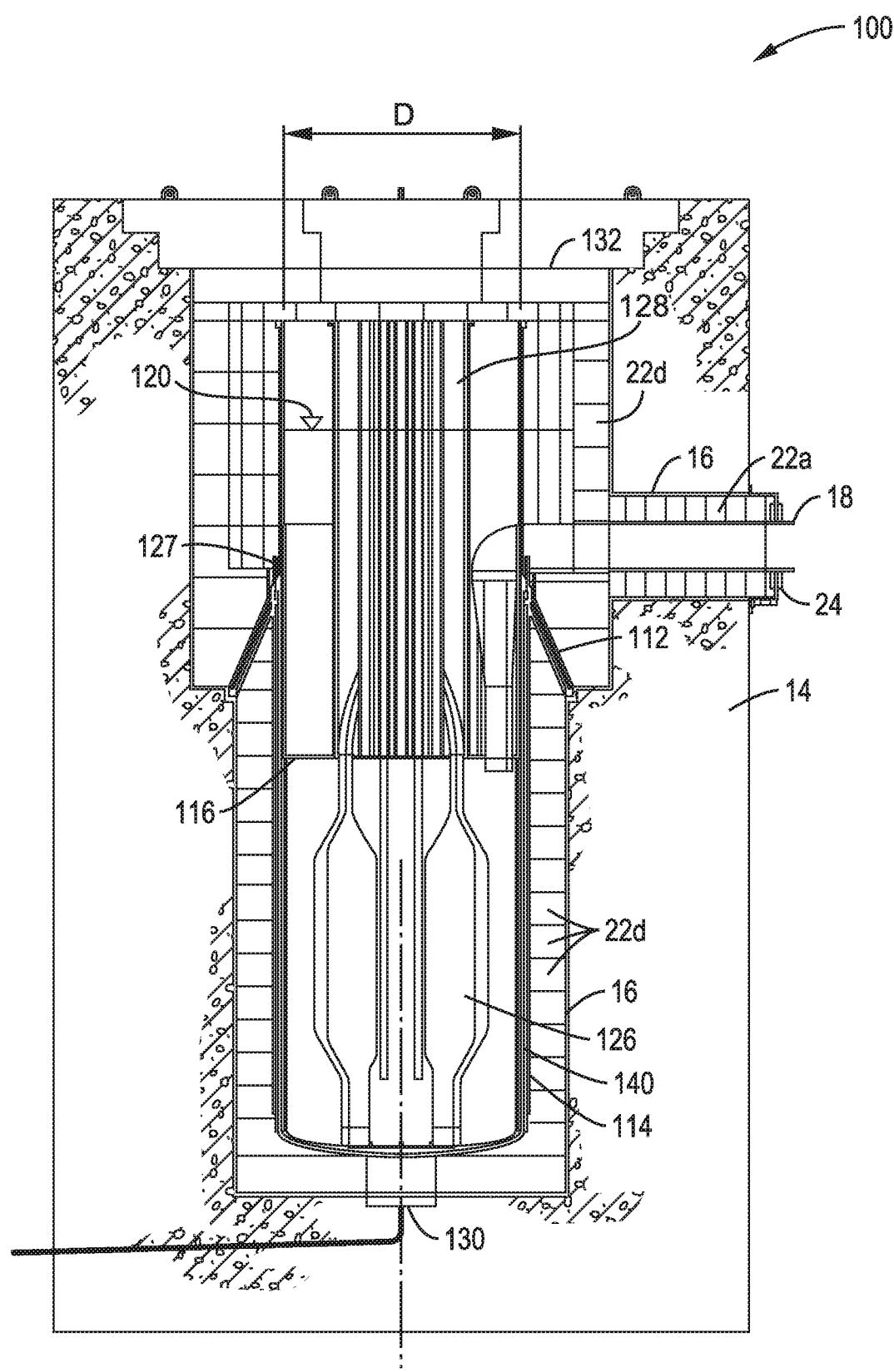
FIG. 4 is a schematic side view of the reactor cavity of FIG. 3 and hot leg connection of FIG. 1A in accordance with the present technology.

As illustrated in the schematic side section view of FIG. 3 and side section view of FIG. 4 of the reactor and containment system 100, the HTR reactor vessel 110 of the present disclosure is instead suspended in a reinforced concrete reactor cavity structure 14 with an actively cooled (water or external air) steel inner liner wall 16. Inside the reactor vessel many designs for cores and reactor vessel internals are possible, with FIG. 3 showing a highly schematic view of a reactor vessel internal core barrel assembly 116 and core 126, and FIG. 4 showing an alternative but similar configuration for core internal structures 116 and core 126.

The majority of the volume between the reactor vessel 110 and the cavity liner 16 is filled with refractory insulator blocks (e.g. upper refractory blocks 22c and lower refractory blocks 22d), which are preferably fabricated from a refractory material such as ceramic insulating fire-brick or baked carbon blocks that is chemically compatible with the reactor coolant. Blocks of the same material also line the hot leg pipe penetrations 18 and cold leg penetrations 68. Under normal operation the blocks 22a/22b/22c/22d act as an insulator, to minimize parasitic heat loss. However, upon addition of salt into the reactor cavity due to a reactor vessel leak or from a buffer salt store, natural circulation of the salt in the gaps between blocks in the lower cavity 22d, and thus can remove heat from the reactor vessel to prevent overheating. The volume of coolant in the vessel and the volume of free space in the lower cavity are designed so that if the vessel leaks, the coolant surface level in the vessel 120 will remain above the reactor core 126.

The reactor vessel 110 is suspended within the steel/concrete composite wall structure 14 and inner cavity liner 16 via a conical reactor vessel support ring 112 that has an upper mounting surface 144 that mates with an annular protrusion 142 in the metallic core structure 110 to form a joint (see FIG. 6) at roughly the vessel diameter D (see FIG. 4). The lower refractory blocks 22d form a conical configuration that terminates at the mounting surface 144 of support ring 112. An annular thermal expansion gap 114 is formed between the inner wall of the refractory blocks 22d and the outer wall of the between the reactor vessel 110.

As seen in FIG. 4, an insulated cavity cover structure 132 is provided to define the upper boundary of the reactor cavity system 100. Also shown in FIG. 4 is the hot leg 18, with penetration formed by insulation 22a and bellow 24. If water is used to cool the cavity liner 16, a liner cooling leak drain sump 130 is provided at the lower end of system 100. Because many different realizations for cores 126 and reactor vessel internals 116 are possible, FIG. 4 shows a different schematic configuration than FIG. 3. The normal reactor coolant level 120 is also shown in FIG. 4.

Figure 5:
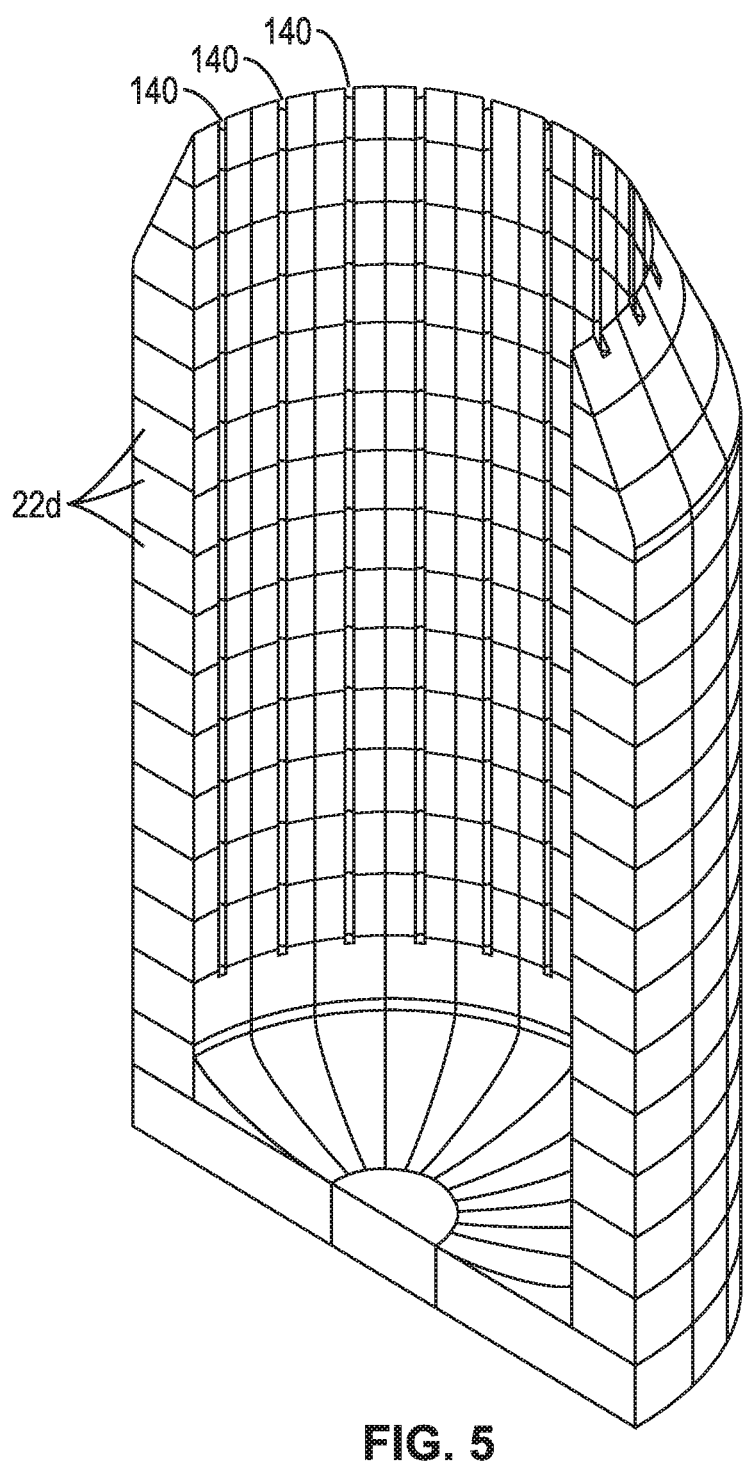
FIG. 5 shows a perspective view of the refractory cavity liner block system of FIG. 3, showing slots for electrical heating elements.
Figure 6:
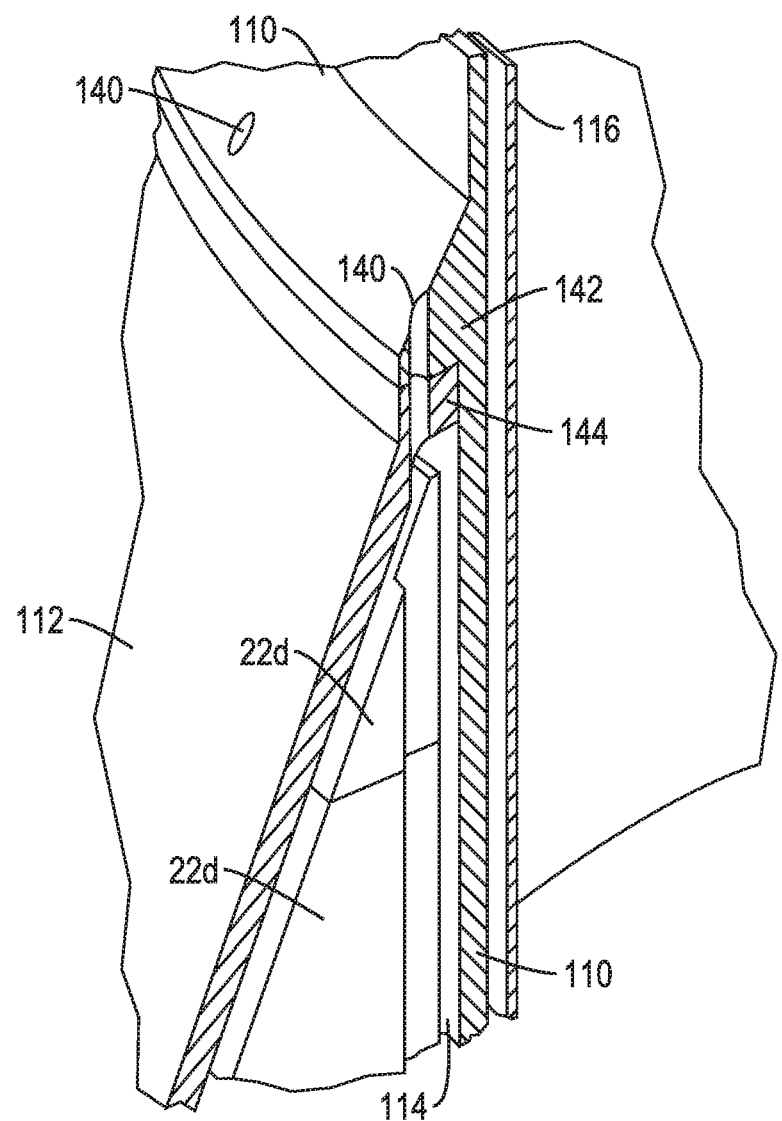
FIG. 6 shows a perspective view of the vessel flange, support ring and electrical heating element insertion locations of the system of FIG. 3.

As seen in FIG. 5 and FIG. 6, a plurality of slots 140 are created in the lower refractory blocks 22d to allow for positioning of electric heating rods 127 down the length of the outside of the reactor vessel. System 100 is configured to provide auxiliary heating of the reactor cavity using electrically heated rods 127 inserted into slots 140. The slots 140 and rods 127 are preferably configured with an adiabatic section (not shown) that extends through the thermal shield 132 above the reactor cavity and internal reactor structures 128, where electrical power connections are made, and the rods can be replaced through openings in the refueling deck above the thermal shield.

The refractory liner blocks 22a/22b/22c/22d are ideally configured to provide insulation and minimize heat losses from the hot legs, cold legs, and reactor vessel to the reactor cavity liner under normal operation. The free volume around the lower cavity blocks 22d is minimized to reduce the amount of coolant volume in the cavity if the reactor vessel leaks or ruptures, such that the level of the coolant 120 in the vessel remains above fuel in the core.

The refractory liner block 22a/22b/22c/22d material is preferably selected to have appropriate chemical compatibility with the reactor coolant, to prevent chemical reactions that would generate gases or excessively corrosive conditions. One such material that is compatible with fluoride salts and with lead is a mixture of ceramic oxides (commonly called "fire brick" and "insulating fire brick") containing $AlO_3$, $MgO$, $SiO_2$, and other refractory oxides. Another exemplary material is baked carbon. Because sodium is highly reactive, metallic or metal-lined insulation blocks are required.

The lower cavity refractory liner blocks 22d are preferably aligned with gaps designed to facilitate natural circulation heat transfer by the salt coolant, if coolant leaks into the cavity space, to create a frozen zone for coolant near the cavity liner and a circulating zone of coolant near the reactor vessel, which assists to transfer heat from the reactor vessel to the cavity liner under accident conditions.

In situations where an accident occurs beyond the design basis, additional coolant may be deliberately injected into the space between the reactor vessel 110 and the cavity liner 16, to establish a frozen coolant zone near the cavity wall and to increase heat transfer from the reactor vessel wall to the cavity wall, to assist in the removal of decay heat.

The refractory liner blocks 22a/22b/22c/22d are also preferably configured to provide sufficient space for the reactor vessel 110, hot legs 18, and cold legs 68 to undergo normal thermal expansion, without contact occurring between the blocks and the hot legs, cold legs, or reactor vessel. For the reactor vessel, the gap is made sufficiently small for contact to occur to provide support to the reactor vessel during beyond design basis accidents, if the vessel reaches very high temperatures where it may undergo accelerated creep deformation.

The refractory liner blocks 22c/22d may be configured with keys and restraint mechanisms (not shown) to transfer horizontal accelerations into the cavity liner under seismic motion.

The refractory liner blocks 22c/22d may be configured with additional gaps or channels for the insertion of inspection instruments such as boroscopes, or cavity electrical heaters may be designed to be removed to allow insertion of inspection instruments.

The refractory liner blocks 22c/22d may be configured to include an annular region near the reactor vessel with a higher thermal conductivity, for example with graphite, and with electric heaters, to allow heating of the reactor vessel under start up and during over cooling events.

3. Overall Heat Transport Configuration

FIG. 7 shows a high-level schematic view of a heat transport and containment isolation system 200 comprising a plurality of coolant loops, hot wells 12, main coolant pumps, systems for the emergency removal of decay heat in the form of a Direct Reactor Auxiliary Cooling System (DRACS) 202, and high-pressure heat exchangers in the form of coiled tube air heaters (CTAH's) 210.

Each hot well cavity 12 is connected to adjacent hot wells by connecting pipes or ducts 34 (see FIG. 1A) above the elevation of the cross-over legs 32 to allow cross flow between the hot wells 12 to maintain a constant hot-well coolant level.

Each coolant loop (two are shown in FIG. 7, one for each CTAH 210) can be drained to a tank 222 using a drain line with a freeze valve 224 and the coolant loop can then be cooled independently for inspection and maintenance while other coolant loops remain filled. When a loop is drained for maintenance, the cover gas system 56 supplies the gas that fills the loop as the cross-over leg 32 drains toward the CTAH 210. For CTAH 210 tube rupture events, the cover gas system 56 has over-pressure control that can direct gas, air, and entrained salt to a knock-out drum and filter system (not shown).

Each CTAH has a hot air duct 212 and cold air duct 214, all configured with expansion bellows 216 similar to bellows 24 and 68 at the hot leg 18 and cold leg 68 penetrations with the containment wall 16 of the reactor cavity structure 14.

The standpipes 52 also comprise at their bottoms cold traps 226, which also serve as low-point drain locations for the main salt drain tanks 222. Cold traps 226 comprise redox control and filter cartridges (not shown) inside the cold trap 226 at the bottom of the stand pipe 52.

4. Exemplary PB-FHR Gas-Gap Isolation System and Refractory Reactor Cavity Liner a. Refractory Reactor Cavity Liner Characteristics A gas-gap containment isolation system and a Refractory Reactor Cavity Liner System (RCCLS) was configured for a Mark 1 Pebble-Bed Fluoride-Salt-Cooled High Temperature Reactor (Mk1 PB-FHR) commercial prototype, the details and components of which may be understood with reference to FIG. 1A through FIG. 7 above.

The Mk1 PB-FHR design is a small, nominally 236 megawatt thermal pebble-fueled FHR with a rail transportable reactor vessel. The vessel configuration is similar to the earlier ORNL SmAHTR design, with a relatively tall, skinny reactor vessel. The vessel is 350 cm in diameter and nominally 10 m tall, with a 360-cm diameter skirt, making it rail transportable, and the vessel wall operates at the Mk1 core inlet temperature of 600° C.

In the reactor cavity system 100 of the present description, the guard vessel is eliminated. Instead, the volume between the reactor vessel and the reactor cavity liner plate is filled with refractory insulation blocks, a refractory reactor cavity liner system 100 (RRCLS), as shown schematically above in FIG. 3 through FIG. 6.

This RRCLS 100 utilizes the high freezing temperature of the low volatility coolant (the salt coolants used in FHRs typically freeze between 450° C. to 510° C., with the freezing temperature being 459° C. for the Mk1 primary salt flibe ($Li_2BeF_4$)). The high freezing temperature replaces the coolant containment function provided by a guard vessel with coolant containment provided by the generation of a "cold crucible" of frozen salt near the reactor cavity liner and wall, which remains at temperatures below the freezing temperature of the coolant during beyond design basis accidents. Because the majority of the volume of the cavity between the reactor vessel 110 and the reactor cavity liner 102 is filled with the refractory blocks 22d, the volume of coolant required to fill the remaining volume is reduced, and therefore the drop in level 120 in the reactor vessel 110 is also reduced.

Under normal operation the refractory liner blocks 22a/22b/22c/22d provide insulation and limits parasitic heat loss. Conduction through the blocks, and natural circulation of the cavity gas in the spaces between the blocks, creates the primary mechanism for heat loss from the reactor vessel surface, which remains at the nominal coolant core inlet temperature of 600° C. under normal operation. The steel cavity liner plate 16 is actively cooled by water (or alternatively air) flowing in pipes behind the plate to maintain the cavity liner plate at an acceptable temperature for the concrete behind the plate (nominally 30° C.).

Under beyond design basis accident conditions where the reactor vessel 110 fails and coolant drains into the cavity, or when additional coolant is injected deliberately into the cavity (from either a frozen storage location located above the cavity, or an emergency coolant injection system), the coolant near the reactor vessel remains molten, because the reactor vessel surface temperature exceeds the salt melting temperature. The coolant freezes at the cavity liner 16, because the temperature is below the coolant freezing temperature. The fact that the Mk1 coolant freezes at a relatively high temperature allows leaks from the reactor cavity to be controlled—even if a crack occurs in the cavity liner 16 or the reactor cavity wall 14, any salt that enters the crack would freeze and plug the leak path.

Initially the cavity liner 16 is at its nominal temperature, but if active cooling is not maintained the temperature climbs over time. If water is supplied to the cavity liner cooling system, it will boil and maintain the liner at a maximum temperature near 100° C. Without water supply, the liner temperature will climb further, and heat removal occurs due to transient conduction into and heating of the steel-concrete composite structure of the reactor cavity wall 14 and then into surrounding building structures.

An interface forms inside the cavity between frozen and molten coolant, and the molten coolant flows by buoyancy driven natural circulation to transfer heat to this interface.

For initial start-up and to control overcooling after shut down, electric heating elements 127 are provided near the reactor vessel 110 surface, to allow heating of the vessel. In the baseline design, these heaters are rods inserted into vertical slots 140 in the cavity liner blocks 22d, adjacent to the reactor vessel 110.

A number of options exist for refractory insulation materials 22a/22b/22c/22d for the Mk1 PB-FHR. Candidate materials include baked carbon insulating material, a low thermal conductivity graphite-like material used in modular helium reactors, fire brick, and insulating fire brick.

Figure 8:
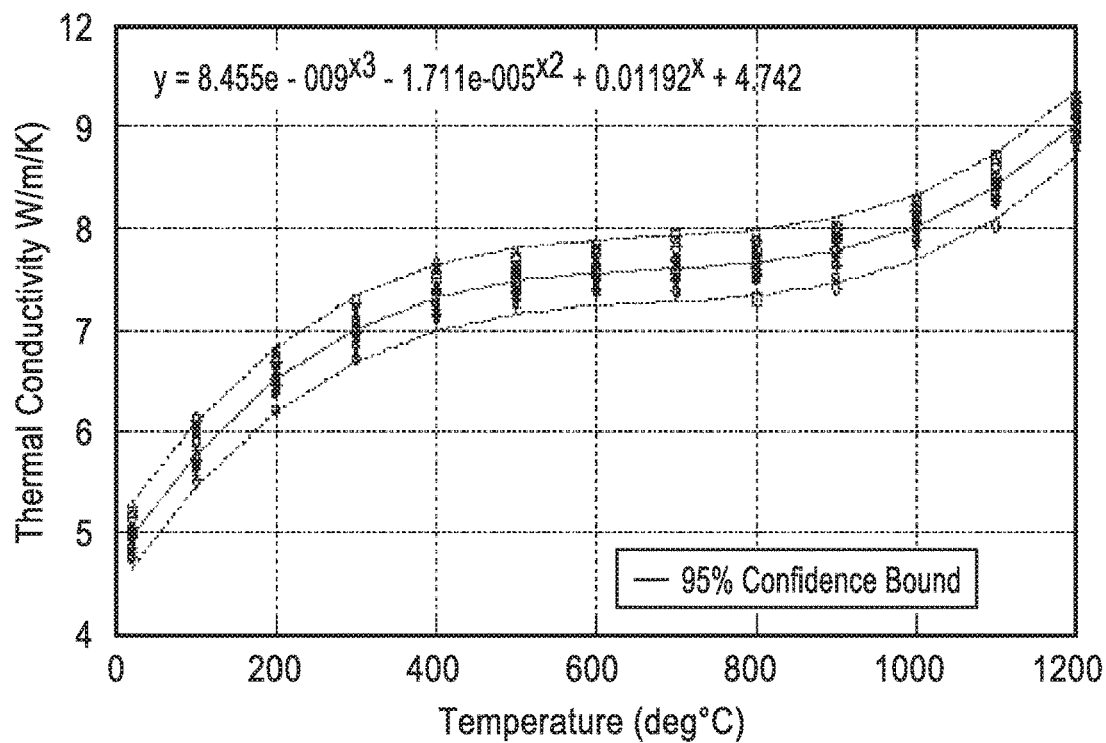
FIG. 8 is a plot of the thermal conductivity of SGL NBC-07 baked graphite of as a function of temperature.

Baked carbon is an insulating material that is formed by vibration molding of an isotropic pitch coke filler and coal tar pitch binder. It is baked at a temperature of 800° C. to 1100° C., pitch impregnated, and baked a second time. Because the carbon is heated sufficiently to cause extensive graphitization, the thermal conductivity remains lower than graphite, but is higher than oxide ceramic insulation materials. Baked carbon will have good compatibility with fluoride salts, but may oxidize in the presence of air. FIG. 8 shows property data for baked carbon insulation material.

Insulating fire brick is composed of a mix of different oxides. In general, these oxides will react slowly with fluoride salts. The fire bricks are porous, so may require surface coatings to prevent salt from imbibing into the porosity. One option is firebrick from BNZ Materials. Type C22Z is preferably selected due to its relatively high strength. Its thermal conductivity at 538° C. is 0.26 W/m° C.

The thermal conductivities of insulating fire brick (<0.5 W/m° C.) are significantly lower than the conductivities of full density fire brick (1.0 to 2.8 W/m° C., 2,050 to 2,645 kg/m$^3$). These higher-density brick materials all have higher thermal conductivity, and lower porosity than the low-density insulating brick.

The Mk1 reactor vessel 110 is preferably fabricated from a high-temperature, high-nickel alloy (e.g. 316 SS, 304 SS, or Alloy N). The reactor vessel dimensions change as it is heated.

The percent expansion of 316 SS when heated from room temperature to 600° C. is calculated at:

$$100(18.2\times10^{-6}\text{ C.}^{-1})(600°\text{ C.}-20°\text{ C.})=1.06\%.$$

The mean coefficient of thermal expansion coefficient of Hastelloy N, an alternative material for the reactor vessel, is $14.0\times10^{-6}$ C.$^{-1}$. The thermal expansion coefficient for Alloy N is about 26% lower than for 316 SS.

Three primary design considerations were calculated with respect to performance of the refractory reactor cavity liner system 100: 1) the parasitic heat loss from the reactor vessel to the reactor cavity wall, 2) the volume of coolant that would drain into the cavity if the reactor vessel fails, and 3) heat transfer to the reactor cavity wall via natural circulation of coolant if the cavity is flooded with coolant.

With respect to heat loss to the reactor cavity, the options for refractory ceramic materials to fill and insulate the reactor cavity have thermal conductivities that range from 0.25 to 8 W/m° C. The nominal Mk1 reactor vessel size, used in this calculation, is 10.0 m high and 3.5 m diameter, with a 0.50-m thick refractory insulation layer between the reactor vessel and the reactor cavity liner. The effective area of the insulated surface, including the sides and bottom, is then:

$$3.14((10.0\text{ m})(3.50\text{ m}+2(0.25\text{ m}))+(3.50\text{ m})^2/4)=135\text{ m}^2.$$

Figure 9:
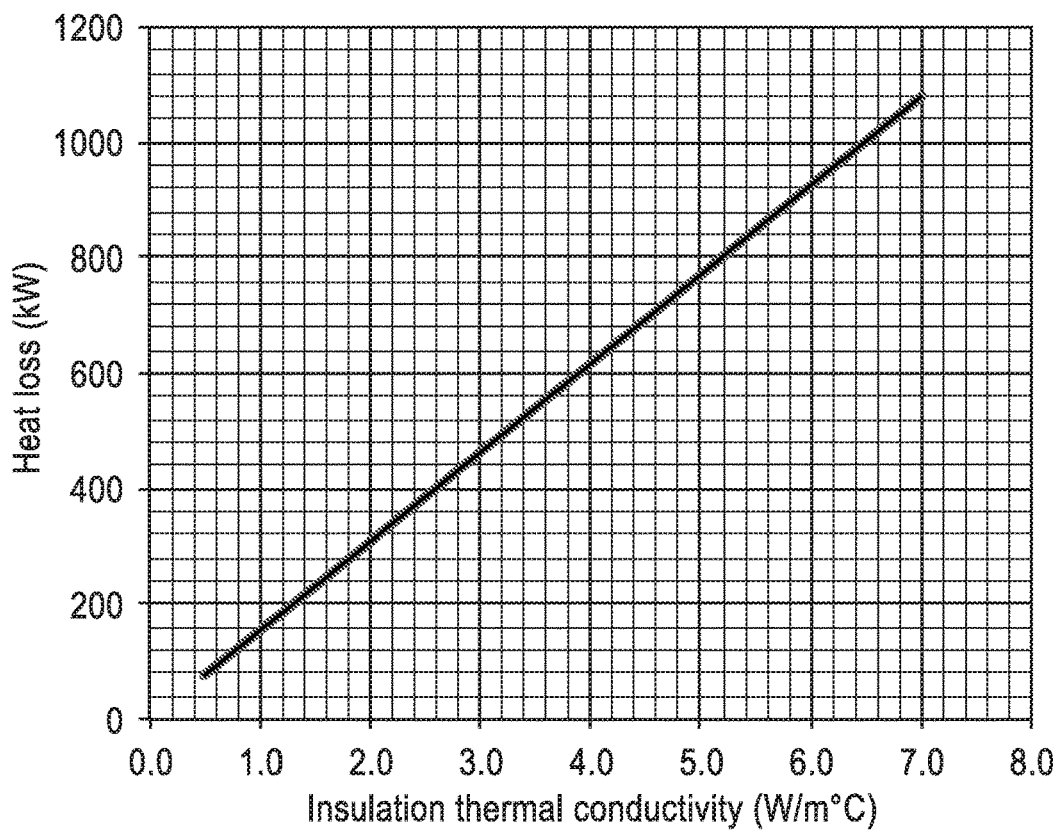
FIG. 9 is a plot of heat loss from a the Mk1 PB-FHR reactor vessel to reactor cavity wall, for a 0.50-m thick insulation layer, with a total effective surface area of 135 m², and vessel and cavity wall temperatures of 600° C. and 30° C. respectively, as a function of the insulation thermal conductivity.

FIG. 9 is a plot of heat loss from a the Mk1 PB-FHR reactor vessel to reactor cavity wall, for a 0.50-m thick insulation layer, with a total effective surface area of 135 m$^2$, and vessel and cavity wall temperatures of 600° C. and 30° C. respectively, as a function of the insulation thermal conductivity.

As shown in FIG. 9, the resulting heat loss depends significantly on the effective thermal conductivity of the liner blocks 22c/22d, and would be below 100 kW for insulating fire brick (0.26 W/m° C.) up to approximately 1.0 MW for baked carbon (7 W/m° C.). This heat loss rate is low compared to the nominal reactor thermal power of 240 MWt. So the selection of the specific refractor material can be made based upon criteria in addition to heat loss, including chemical compatibility with coolant, impermeability, mechanical strength, and cost.

With respect to drain volume, it is desired that if the reactor vessel 110 leaks, the maximum drop of level 120 in the vessel remains above the top of pebble fuel located in the defueling chute above the reactor core, called the faulted level here. The top of the system 100 defueling chute is nominally 7.0 m above the bottom of the reactor vessel. The total volume of the reactor cavity, below this elevation, is calculated at:

$$V_{cf}=(7.0\text{ m})3.14((3.5\text{ m}+(0.5\text{ m}))^2-(3.5\text{ m})^2)/4+(0.5\text{ m})3.14(3.5\text{ m}+(0.5\text{ m}))^2/4=52\text{ m}^3.$$

The free volume in the cavity includes the volume in the gap 114 between the reactor vessel 110 and the blocks 22d, and the volume of the gaps between blocks 22d, other blocks, and the reactor cavity wall 102.

The gap between the reactor vessel and the refractory blocks is established to allow the vessel to undergo thermal expansion under "beyond design basis accidents" from its normal operating temperature of 600° C. up to the temperature where the vessel material rate of thermal creep would become large. At this beyond design basis accident temperature, selected here to be 900° C., it is desired that the vessel begin to contact the refractory blocks, so that the blocks provide physical support to limit further expansion and creep of the vessel.

In heating from 600 to 900° C., the vessel diameter increases by 1.9 cm, and the bottom of the vessel drops 3.8 cm. The volume change of the vessel, due to this expansion in size, is 1.1 m$^3$.

The volume of the gaps between refractory blocks is a design parameter that depends upon the geometry of the blocks and the precision of their manufacture. The nominal blocks 22d are 0.5 m×0.5 m×0.5 m. While this exceeds the maximum dimensions of commercial insulating fire brick, these larger blocks are fabricated by cementing together assemblies of smaller blocks. If the porosity of the blocks is found to be an issue for absorbing Mk1 coolant, the blocks are coated with a glazing material to reduce the permeability of the surface.

Gaps between blocks 22d will vary between 0.5 and 1.0 cm, with an average gap width of 0.7 cm. In this case, the fraction of the total lower cavity volume occupied by gaps between the blocks and the cavity wall, and blocks with neighboring blocks, will be (1+0.5(4))(0.7 cm)/(50 cm)=0.042, or 4.2% of the cavity volume. In this case, the total void volume in the cavity will be:

$$V_v=0.042(52\text{ m}^3)+1.1\text{ m}^3=3.3\text{ m}^3.$$

In the reactor vessel of the present description, if salt occupies 75% of the cross-sectional area of the vessel at the elevation above the defueling chute and below the bottoms of the hot and cold legs, then the level drop caused by a leak in the reactor vessel would be:

$$H=(3.3\text{ m}^3)/0.25(3.1415)(3.5\text{ m})^2)=0.34\text{ m}.$$

This value is sufficiently small so that high assurance exists that fuel in the reactor will remain covered with coolant.

Heat transfer from the reactor vessel 110 to the cavity wall 102 changes greatly under "beyond design basis accident" conditions where the cavity is flooded with coolant. The volumetric heat capacity of the Mk1 coolant (flibe) is nominally 4500 kJ/m³° C., compared to argon and air (approximately 0.4 kJ/m³° C. at 627° C.).

b. Primary Loop "Gas-Gap" Isolation System

The Mk1 PB-FHR heat transport and containment isolation system 200 (FIG. 7) uses the primary coolant to directly heat air for the nuclear air combined cycle power conversion system. Compared to previous FHR designs, as well as the long-term conventional practice for sodium fast reactors (SFRs), the elimination of an intermediate loop in the Mk1 PB-FHR has major implications for simplification, cost reduction, and overall plant safety.

The reason that intermediate loops have been conventional for SFRs has been the requirement to mitigate the potential over pressure, water hammer, and shock loading that would occur if sodium and water were to interact following tube failure in a steam generator. Because fluoride salt coolants are chemically stable, no significant chemical reactions will occur under a tube failure in a coiled tube air heater (CTAH) (or a steam generator). However, it remains possible that a tube failure could cause temporary pressure increase and generate water hammer in the salt piping subsystem.

The system 200 of the present disclosure introduces the concept of using "gas gaps" in the hot and cold salt piping system to isolate the reactor vessel and reactor cavity/containment from the external salt piping system and CTAHs. Immediately adjacent to the containment penetration, both the hot and cold salt legs 18/68 have free surfaces communicating with the salt cover gas system, which make it deterministically impossible to transmit high pressure into the reactor vessel and containment.

For each hot leg 18, the free surface exists in the hot well 12, which may include a gate-type isolation valve 36 and inside a cantilevered, sump-type main-salt pump's (28) take suction. For each cold leg 68, a free surface is provided in a standpipe 52/88, which may also contain an isolation valve 64.

The isolation of the hot and cold legs 18/68 is further enhanced by the gate valve, which has an activation stem that extends up through the liquid free surface. The gate valves 36/64 may use a carbon fiber reinforced seat material on the valve wedge to prevent self-welding when closed.

The hot well or wells 12 are located immediately adjacent to the reactor cavity structure 14 to minimize the length of the hot legs 18 and cold legs 68, as shown in FIG. 1A, FIG. 1B, FIG. 2A, FIG. 2B, FIG. 2C, and FIG. 2D.

The hot wells 12 are designed to have a sufficiently large coolant surface area that level swell due to thermal expansion of the coolant and due to level changes at other free surfaces in the primary system result in acceptable level changes in the hot well. Under normal power operation, the coolant level in the hot wells is above cross over legs 32 that connect the hot wells to the high pressure heat exchangers. For multiple hot wells, conduits 34 between the wells, above the cross over legs 32, keep the level uniform in the hot wells. Gate valves 36 in each hot well allow each hot leg to be isolated.

Because the Mk1 system 200 primary coolant, flibe, has a very high volumetric heat capacity, and because the design temperature drop across the Mk1 core is relatively large (100° C.), the total volumetric flow of primary coolant to transport 236 MWth in a Mk1 PB-FHR is only 0.50 m³/sec. This makes it possible to design the reactor to operate with a relatively small pressure drop between the cold legs 68 and hot 18 legs, with the design goal being a total pressure drop between 2 and 3 meters of head.

Each of the two cold legs 68 has a vertical standpipe 52/88 located adjacent to the reactor cavity/containment wall. FIG. 2A through FIG. 2D show various realizations of this standpipe. Because each standpipe communicates with the salt cover gas system, they provide a "gas gap" to prevent overpressure of the reactor vessel and containment.

Chilled coolant exiting the bottom of each CTAH 210 flows in a downward sloping pipe over to the stand pipe 52/88, up the stand pipe 52/88, and then horizontally through a containment wall penetration in a cold leg pipe 68 into the reactor vessel 110.

FIG. 2A shows the simplest realization of a standpipe 50a, where the top of each standpipe extends approximately 3 m above the upper horizontal cold leg 68, to accommodate the level swell that occurs under pump operation due to the pressure difference across the reactor vessel. The specific height is determined by the detailed design of the flow path in the reactor and the resulting pressure drop. An overflow pipe 60 is provided above the normal maximum free surface elevation 80, which will drain coolant back to the hot well 12 if the pressure drop across the reactor exceeds its normal design value or if the cold leg is over pressurized.

From the discussion above it will be appreciated that the technology can be embodied in various ways, including the following:

1. A high temperature reactor (HTR) cooled by a low-volatility, liquid coolant, comprising: a reactor cavity having an inner cavity liner; a reactor vessel disposed within the reactor cavity; and wherein the reactor vessel is suspended within the reactor cavity with a plurality of refractory insulator blocks disposed between the inner cavity liner and the reactor vessel.

2. The HTR of any preceding embodiment: wherein the reactor vessel is suspended in the reactor cavity via a conical support ring having a first end coupled to the inner cavity liner and a second end coupled to the reactor vessel; and wherein the conical support ring accommodates temperature differentials between the reactor vessel and reactor cavity.

3. The HTR of any preceding embodiment: wherein the second end of the conical support ring attaches to the reactor vessel via a conical joint; and wherein the conical joint is configured to allow for differential thermal expansion or horizontal loading within the reactor vessel.

4. The HTR of any preceding embodiment, wherein gaps between the plurality of refractory insulator blocks act to provide flow paths for natural circulation of coolant to thereby remove heat from the reactor vessel in the event of a reactor vessel coolant leak.

5. The HTR of any preceding embodiment, further comprising: an annular thermal expansion gap formed between the plurality of refractory insulator blocks and the reactor vessel.

6. The HTR of any preceding embodiment, wherein the inner cavity liner comprises an actively cooled steel liner plate.

7. The HTR of any preceding embodiment, further comprising: a plurality of slots disposed within an internal surface of the refractory blocks adjacent said annular thermal expansion gap; and a plurality of electric heating rods disposed within the plurality of slots, the electric heating rods running substantially along the length of the reactor vessel.

8. The HTR of any preceding embodiment, the reactor cavity having an outer containment wall, the HTR further comprising: a hot-leg pipe coupled to the reactor vessel at a penetration of the outer containment wall; wherein the hot-leg pipe provides a coolant flow path from the reactor vessel through the outer containment wall to a main-salt loop external to the reactor vessel; wherein the hot-leg penetration is insulated and has a flexible bellows seal.

9. The HTR of any preceding embodiment, further comprising: an isolation valve and a hot-well vessel coupled to the hot leg; wherein hot coolant exiting the reactor vessel flows through the isolation valve into the hot-well vessel.

10. The HTR of any preceding embodiment, wherein the hot-well vessel provides a substantial free liquid surface, the hot-well vessel further comprising: a centrifugal pump submerged in the hot well and configured to circulate the hot coolant into a crossover-leg to a high-pressure heat exchanger; and wherein the coolant free surface has a cover gas maintained at a nearly constant pressure and thus prevents high-pressures from being transmitted into the reactor vessel.

11. The HTR of any preceding embodiment, the reactor cavity having an outer containment wall, the HTR further comprising: a cold-leg pipe coupled to the reactor vessel at a penetration of the outer containment wall; wherein the cold-leg pipe provides a coolant flow path into the reactor vessel through the outer containment wall from a main-salt loop external to the reactor vessel; wherein the cold-leg penetration is insulated and has a flexible bellows seal 12. The HTR of any preceding embodiment, further comprising: a standpipe coupled to the cold-leg pipe; wherein the standpipe provides a free liquid surface; and wherein the liquid free surface has a cover gas maintained at a nearly constant pressure and thus prevents high-pressures from being transmitted into the reactor vessel.

13. A high-temperature containment-isolation system for an HTR, comprising: a reactor vessel disposed inside a reactor cavity having an outer containment wall; a hot-leg pipe coupled to the reactor vessel at a hot-leg penetration of the outer containment wall; wherein the hot-leg pipe provides a coolant flow path having a liquid free surface near the hot-leg penetration; and wherein the liquid free surface has a cover gas maintained at a nearly constant pressure and thus prevents high-pressures from being transmitted into the reactor vessel.

14. The system of any preceding embodiment, further comprising: an isolation valve and a hot-well vessel coupled to the hot-leg coolant flow path; and wherein hot coolant exiting the reactor vessel flows through the isolation valve into the hot-well vessel.

15. The system of any preceding embodiment, wherein the hot-well vessel provides a substantial free liquid surface and a submerged centrifugal pump that circulates the hot coolant through a crossover-leg.

16. The system of any preceding embodiment, wherein the hot-well vessel has sufficient volume to accommodate level changes due to thermal expansion of the coolant and level changes elsewhere in the loop due to flow caused by operation of the pump.

17. The system of any preceding embodiment, wherein the isolation valve comprises a gate valve to seal and isolate the hot-leg pipe and reactor vessel from the hot-well vessel.

18. The system of any preceding embodiment, further comprising: a standpipe to allow for reentry of cold coolant into the reactor vessel through a cold-leg pipe entering through a cold-leg penetration of the outer containment wall; wherein the standpipe has a liquid free surface having a cover gas maintained at a nearly constant pressure to prevent high-pressures from being transmitted into the reactor vessel.

19. The system of any preceding embodiment, wherein the standpipe comprises a substantially neutrally buoyant plug configured to displace a significant portion of the volume of coolant above the cold-leg penetration.

20. The system of any preceding embodiment, wherein the standpipe comprises a gate valve to seal a cold leg pipe entering the reactor vessel.

21. The system of any preceding embodiment, wherein the standpipe comprises a seal loop to prevent the cold leg from draining when the standpipe is drained.

22. The system of any preceding embodiment, further comprising: a second hot-leg pipe coupled to the reactor vessel at a second hot-leg penetration of the outer containment wall; and wherein the second hot-leg pipe provides a coolant flow path with a second hot-well vessel coupled to the second hot-leg, the second hot-well vessel having a liquid free surface near the second hot-leg penetration.

23. The system of any preceding embodiment, wherein the hot-well vessel and second hot-well vessel are connected by a conduit to allow flow between the hot-well vessel and second hot-well vessel and to maintain a nearly equal liquid level between the hot-well vessel and second hot-well vessel.

24. The system of any preceding embodiment, wherein one or more of the hot-well vessel and second hot-well vessel comprises a gate valve to seal and isolate the hot-leg pipe and reactor vessel from either the hot-well vessel or second hot-well vessel.

25. The system of any preceding embodiment, wherein the conduit is located above the elevation of a crossover leg allowing coolant to exit either the hot-well vessel or second hot-well vessel.

26. The system of any preceding embodiment, further comprising: a plurality of standpipes to allow for reentry of cold coolant into the reactor vessel through a plurality of cold-leg pipes entering through a cold-leg penetration; and wherein each standpipe has a liquid free surface having a cover gas maintained at a nearly constant pressure to prevents high-pressures from being transmitted into the reactor vessel.

27. The system of any preceding embodiment, wherein each standpipe comprises a substantially neutrally buoyant plug configured to displace a significant fraction of the volume of coolant above the penetration into containment.

28. The system of any preceding embodiment, wherein each standpipe comprises gate valve to seal each cold leg pipe entering the reactor vessel.

29. The system of any preceding embodiment, wherein each standpipe comprises a seal loop to prevent each cold leg from draining when the standpipe is drained.

30. A high-temperature containment-isolation system for an HTR, comprising: a reactor vessel disposed inside a reactor cavity having an outer containment wall; a standpipe to allow for reentry of cold coolant into the reactor vessel through a cold-leg pipe entering through a cold-leg penetration of the outer containment wall; and wherein the standpipe has a liquid free surface having a cover gas maintained at a nearly constant pressure to prevent high-pressures from being transmitted into the reactor vessel.

31. The system of any preceding embodiment, wherein the standpipe comprises a substantially neutrally buoyant plug configured to displace a significant portion of the volume of coolant above the cold-leg penetration.

32. The system of any preceding embodiment, wherein the standpipe comprises a gate valve to seal a cold leg pipe entering the reactor vessel.

33. The system of any preceding embodiment, wherein the standpipe comprises a seal loop to prevent the cold leg from draining when the standpipe is drained.

34. The system of any preceding embodiment, further comprising: a hot-leg pipe coupled to the reactor vessel at a hot-leg penetration of the outer containment wall; wherein the hot-leg pipe provides a coolant flow path having a liquid free surface near the hot-leg penetration; and wherein the liquid free surface has a cover gas maintained at a nearly constant pressure and thus prevents high-pressures from being transmitted into the reactor vessel.

35. The system of any preceding embodiment, further comprising: an isolation valve and a hot-well vessel coupled to the hot-leg coolant flow path; and wherein hot coolant exiting the reactor vessel flows through the isolation valve into the hot-well vessel.

36. The system of any preceding embodiment, wherein the hot-well vessel provides a substantial free liquid surface and a submerged centrifugal pump that circulates the hot coolant through a crossover-leg.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for." No claim element herein is to be construed as a "step plus function" element unless the element is expressly recited using the phrase "step for."

What is claimed is:

1. A high-temperature containment-isolation system for an HTR, comprising:
   a reactor vessel disposed inside a reactor cavity having an outer containment wall;
   a hot-well vessel with a hot-leg pipe coupled to the reactor vessel at a hot-leg penetration of the outer containment wall, said hot-well vessel having an interior surface;
   wherein the hot-leg pipe provides a coolant liquid flow path from the hot-leg penetration through the hot-well vessel;
   wherein a section of the interior surface of the hot-well vessel is a liquid-free surface; and
   wherein the liquid-free surface has a cover gas maintained at a constant pressure and thus prevents coolant over-pressures from being transmitted into the reactor vessel.

2. A system as recited in claim 1, further comprising:
   an isolation valve within the hot-well vessel controlling the hot-leg coolant flow path into the hot-well vessel;
   wherein hot coolant exiting the reactor vessel flows through the isolation valve into the hot-well vessel.

3. A system as recited in claim 1, wherein the hot-well vessel further comprises a submerged centrifugal pump that circulates the hot coolant through a crossover-leg.

4. A system as recited in claim 3, wherein the hot-well vessel has sufficient volume to accommodate level changes due to thermal expansion of the coolant and level changes within the system due to flow caused by operation of the pump.

5. A system as recited in claim 2, wherein the isolation valve comprises a gate valve to seal and isolate the hot-leg pipe and reactor vessel from the hot-well vessel.

* * * * *